(12) United States Patent
Yi

(10) Patent No.: US 7,197,145 B2
(45) Date of Patent: Mar. 27, 2007

(54) METHOD FOR SETTING UP RADIO BEARER IN MOBILE COMMUNICATION SYSTEM

(75) Inventor: Seung June Yi, Seoul (KR)

(73) Assignee: LG Electronics Inc., Seoul (KR)

(*) Notice: Subject to any disclaimer, the term of this patent is extended or adjusted under 35 U.S.C. 154(b) by 738 days.

(21) Appl. No.: 10/115,004

(22) Filed: Apr. 4, 2002

(65) Prior Publication Data

US 2002/0147021 A1 Oct. 10, 2002

(30) Foreign Application Priority Data

Apr. 7, 2001 (KR) ................. 2001-18519

(51) Int. Cl.
*G06F 15/16* (2006.01)
*G06F 11/00* (2006.01)
*G06F 12/14* (2006.01)
*G06F 12/16* (2006.01)
*G06F 15/18* (2006.01)
*H04K 1/00* (2006.01)
*H04L 9/00* (2006.01)
*G08B 23/00* (2006.01)

(52) U.S. Cl. .............. 380/270; 380/250; 380/255; 709/232; 713/151; 713/152; 726/22

(58) Field of Classification Search ......... 380/270
See application file for complete search history.

(56) References Cited

U.S. PATENT DOCUMENTS 5,712,915 A * 1/1998 Onufry, Jr. ............. 380/270

6,389,008 B1 * 5/2002 Lupien et al. ............. 370/352
6,782,274 B1 * 8/2004 Park et al. ............... 455/552.1
6,826,406 B1 * 11/2004 Vialen et al. .............. 455/450
6,853,852 B1 * 2/2005 Park et al. ................. 455/561
6,882,727 B1 * 4/2005 Vialen et al. ............... 380/33
7,054,268 B1 * 5/2006 Parantainen et al. ........ 370/231

FOREIGN PATENT DOCUMENTS

EP 1195923 A2 4/2002
WO WO 9939525 A1 * 8/1999
WO WO 00/54456 9/2000

OTHER PUBLICATIONS

Grecas, Constantinos F., Maniatis, Sotirios I. and Venieris, Iakovos S., "Towards the Introduction of the Asymmetric Cryptography in GSM, GPRS, and UMTS Networks". Computers and Communications, 2001, pp. 15-21. Found on the World Wide Web at: http://ieeexplore.ieee.org/iel5/7446/20240/00935349.pdf?tp=&arnumber=935349&isnumber=20240.*
EP Search Report dated Dec. 29, 2002.
Universal Mobile Telecommunications Systems (UMTS); RRC Protocol Specification (3GPP TS 25.331 version 4.0.0 Release 4) fig 2, p. 32, line 1-40 ON CD (URL: www.etsi.org).
Digital Cellular Telecommunications system (3GPP TS 24.007 version 3.7.0 release 1999) p. 27-49 and 50-63 table 6.7.2 ON CD (URL: www.etsi.org.

* cited by examiner

*Primary Examiner*—Christopher Revak
(74) *Attorney, Agent, or Firm*—KED & Associates, LLP

(57) ABSTRACT

A method for setting up a radio bearer in a radio interface protocol, including transferring ciphering performance information from a designated layer to a radio resource control (RRC) layer, transferring the ciphering performance information from the RRC layer to a radio link control (RLC) layer, and enciphering data at the RLC layer in accordance with the ciphering performance information.

27 Claims, 6 Drawing Sheets

METHOD FOR SETTING UP RADIO BEARER IN MOBILE COMMUNICATION SYSTEM

BACKGROUND OF THE INVENTION

1. Field of the Invention

The present invention relates to a mobile communication system and, more particularly, to a method for selecting a ciphering process when a radio resource control layer designates a radio bearer.

2. Background of the Related Art

In the 3$^{rd}$ generation partnership project (3GPP), which is a third generation network and radio access system, the radio resource control (RRC) layer is a protocol layer that controls each layer. The RRC layer belongs to the third layer out of 3 lower layers of the open systems interconnection (OSI) reference model. The three lower layers include a packet data convergence protocol (PDCP) layer, a broadcast/multicast control (BMC) layer, a radio link control (RLC) layer, a medium access control (MAC) layer, and a physical (PHY) layer. Here, the PHY layer belongs to the first layer, and the other layers, that is, the PDCP layer, BMC layer, RLC layer and MAC layer belong to the second layer.

FIG. 1 is a schematic diagram illustrating a configuration of the radio interface protocol in the 3GPP. The radio interface protocol includes an RRC layer 10 that controls each layer, a PDCP layer 21 that transfers packet data, a BMC layer 22 that transfers broadcast and multicast data, an RLC layer 23 that is in charge of flow control as a data link layer, a MAC layer 24 that transfers (or bears) the data provided by RLC layer 23, using an appropriate mapping relation between a logical channel and a transport channel, and a PHY layer 30 that transfers data to a radio section by loading the data into a physical channel.

The RRC layer 10 is defined on a control plane only and is in charge of controlling the transport channels and the physical channels, in connection with setup, reset, and release of radio beaters (RB). To set up the radio bearers means to define protocol layers and channel characteristics necessary to provide a specific service and to designate each concrete parameter and operation method.

PDCP 21 is located at an upper portion of the RLC layer and makes the data, which has been transmitted through a network protocol like IPv4 or IPv6, transmittable through an air interface.

BMC layer 22 transfers a message from a cell broadcast center (CBC) through the air interface. More specifically, BMC layer 22 schedules a cell broadcast message, which has been transferred through an end, before actually transferring the message. In general, BMC layer 22 transfers the data through RLC layer 23, which is operated in an unacknowledged mode (UM).

RLC layer 23 configures an appropriate RLC protocol data unit (PDU) for transfer, to achieve a better segmentation and concatenation feature for the RLC service data unit (SDU) that is transferred from a higher layer. RLC layer 23 performs an automatic repeat request function (ARQ) that is responsible for retransmission of an RIG PDU lost during transfer. Based on how the RLC PDU is transmitted from a higher layer, PLC layer 23 operation may be characterized as transparent mode (TM) acknowledged mode (AM), and unacknowledged mode (UM). RLC layer 23 has an RLC buffer for storing the RLC SDU or RLC PDU.

A logical channel (L_CH: Logical CHannel) is interposed between and accessed by RLC layer 23 and MAC layer 24. To perform frequency division duplex (FDD), the current 3GPP uses 6 logical channels, including DTCH, DCCH, CTCH, CCCH, BCCH and PCCH.

The Dedicated Traffic CHannel (DTCH) is a channel that transfers dedicated data of a specific user equipment (UE), and the Dedicated Control CHannel (DCCH) is a channel that transfers dedicated control information of a specific user equipment. The Common Traffic CHannel (CTCH) is a channel that transfers common data to a number of user equipments, and the Common Control CHannel (CCCH) is a channel that transfers common control information to a number of user equipments. Also, the Broadcast Control CHannel (BCCH) is a channel that transfers broadcast information, and the Paging Control CHannel (PCCH) is a channel that transfers paging information.

The transport channel (T_CH: Transport CHannel) is interposed between and accessed by MAC layer 24 and PHY layer 30. In this case, 7 transport channels, including DCH, BCH, FACH, PCH, RACH, CPCH and DSCH, are used to support FDD.

First of all, the Dedicated CHannel (DCH) is a channel for transferring dedicated data of a specific user equipment, and the Broadcast CHannel (BCH) is a channel for transferring broadcast information. The Forward Access CHannel (FACH) is a channel for transferring forward (down) data, and the Paging CHannel (PCH) is a channel for transferring paging information. The Random Access CHannel (RACH) is a channel for transferring reverse data, the Common Packet CHannel (CPCH) is a channel for transferring small packet data, and the Downlink Shared CHannel (DSCH) is a channel for transferring a large volume of data in a forward direction.

A plurality of logical channels (L_CH) can be multiplexed to make one transport channel (T_CH). Similarly, a plurality of transport channels (T_CH) can be multiplexed to make one physical channel.

Using the configuration described above and illustrated by FIG. 2, the radio interface protocol performs a radio bearer (RB) setup process for defining or specifying characteristics of layers and channels necessary to provide a specific service. This radio bearer setup process is depicted in FIG. 2.

Particularly, FIG. 2 illustrates the method for setting up a radio bearer in the radio interface protocol of the related art. To set up the RB, RRC layer 204 first receives a radio bearer setup command from one or every layer, including a peer RRC 201, a higher layer 202 and a BMC layer 203, respectively (S211 through S213). Then, RRC layer 204 transfers the radio bearer setup command to lower layers (e.g., BMC layer 203, PDCP layer 205, RLC layer 206, MAC layer 207, or PHY layer 208) to set up an appropriate layer for data service (S221 through S225). Therefore, through the radio bearer setup process, it is decided whether or not to use PDCP layer 205 and BMC layer 203. Also, it is decided as to which one of several RLC modes, particularly among the acknowledge mode (AM), unacknowledged mode (UM), or transparent mode (TM), should be used. Moreover, while generating an RLC entity, it is decided which logical channel should be used in between RLC layer 206 and MAC layer 207, and which physical channel should be used in PHY layer 208. In short, a radio bearer is set up by specifying the parameters and the operation method thereof RLC layer 206, unlike the other layers, is not always available. In fact, it is generated only when the RB is setup and discarded after providing a service.

According to the current 3GPP standard, one RB must use one RLC entity. Also, a user equipment can accommodate a maximum of 32 radio bearers at one time, and unlike the other layers, a number of RLC entities can exist at the same time.

The RLC entity is divided into a transparent mode entity, to which an RLC header is not attachable, and a non-transparent mode entity, to which an RLC header is attachable. The non-transparent mode entity can be further divided into the acknowledge mode (AM) entity, having an acknowledge signal, and the unacknowledged mode (UM) entity that lacks an acknowledge signal.

Configuration of the RLC AM entity will now be explained with reference to FIG. 3. As shown in the drawing, the AM entity 320 at the transmitting side carries out a segmentation/concatenation process 301 to produce uniformly sized protocol data units, from the service data units received from a higher layer. Thereafter, a header having a sequence number (SN) is integrated 302 into the protocol data unit.

The PDU, including the header, is saved in a retransmission buffer 303, in case it needs to be retransmitted later. In the meantime, this PDU is multiplexed by a multiplexer 304 and is ciphered 305 for the sake of data security.

Afterwards, the ciphered PDU is temporarily stored in the transmission buffer 306 and is transferred to a set fields block 307. With set fields block 307, other fields (e.g., D/C and Poll field), except for the sequence number of the RLC header, are set to appropriate values and transferred to a lower layer.

The PDU loaded with data information from a higher layer is called an AM Data (AMD) PDU and the configuration thereof is shown in FIG. 4. As depicted in the drawing, the RLC layer includes two kinds of protocol data units with different formats. One of them is an Unacknowledged Data PDU (UMD PDU), which is used especially when no acknowledge signal needs to be sent to the transmitting side. The other is an Acknowledged Data PDU (AMD PDU), which is used when an acknowledge signal does need to be sent to the transmitting side. As shown in FIG. 4, AMD PDU includes a header, a length indicator group, data, and padding (PAD) or a piggyback type of PDU.

Ciphering is performed on the AMD PDU only. The header group, particularly the first two octets (a group including sequence number), is not enciphered, only the groups after the header group are enciphered.

The receiving side of AM entity 320 demultiplexes 308 the protocol data units transferred from a lower layer and stores the demultiplexed protocol data units in the receiving buffer 309, temporarily. Once all of the protocol data units needed to configure a complete SDU are received, AM entity 320 deciphers 310 these protocol data units, removes 311 the RLC header, reassembles 312 the deciphered protocol data units into the SDU, and transfers them to a higher layer.

FIG. 5 illustrates an RLC UM entity 500. The transmitting side 501 UM entity 500 performs the segmentation/concatenation process 503, to form the service data units received from a higher layer into uniformly sized PDUs, and enciphers 504 the PDU for the sake of data security. Later, REC UM entity 500 configures UMD protocol data units by including 505 the header, having a sequence number, storing the UMD protocol data units in the transmission buffer 506, and transferring the UMD PDUs to the radio section through a lower layer.

FIG. 6 shows the configuration of the UMD PDU. Referring to FIG. 6, the UMD PDU includes a header, a length indicator group, data, and a PAD. The first octet in the UMD PDU format indicates a header having a sequence number. This header group is not enciphered, but the rest of the group is enciphered.

Referring again to FIG. 5, the receiving side 502 of UM entity 500 receives the UMD PDU and stores it in the receiving buffer 507, temporarily. When all of the protocol data units needed to configure a complete SDU are received, the RLC header is removed 508 from the protocol data units. Then, UM entity 500 deciphers 509 the protocol data units, reassembles 510 the deciphered protocol data units into the SDUs, and finally transfers the SDUs to a higher layer.

The 3GPP system conducts the ciphering process to secure user data. The ciphering process is carried out in the RLC layer, according to the RLC mode, especially when the AM and UM are involved. On the other hand, ciphering is performed in the MAC layer when the TM is involved. One thing to notice here is that not all data is enciphered. That is to say, in case of the AM and UM, the ciphering process is performed only on the data that is transferred to the DTCH or DCCH logical channels and not for the other logical channels. And, in case of the TM, only the data transferred to the DCH transport channel, but not the other transport channels, goes through the ciphering process. This ciphering process is not available for every radio bearer though. Instead, it is decided whether or not to carry out the ciphering process on all of the radio bearers overall.

In general, when the enciphered data is transferred to the receiving side from the transmitting side, the receiving side reconstitutes the data through the deciphering process. At this time, it is important that the transmitting side and the receiving side use the same algorithm and ciphered parameters in order to transceive data more precisely. This may be better understood with reference to FIGS. 3 and 5.

However, one problem of the traditional method is that the ciphering process can't be separately performed on an individual radio bearer, since the ciphering process is performed on all of the radio bearers or none at all. In other words, if the user wishes to carry out the ciphering process on a certain radio bearer only, while leaving other radio bearers alone, the related art method for setting up the radio bearer is certainly not the right choice.

For example, the BMC data currently uses the RLC UM entity and is transferred to the CTCH, among other logical channels. Therefore, no ciphering process is performed on the BMC data. The problem with this is that within the BMC data there is data that does not have to be enciphered, but also data that does need to be enciphered. Thus, the ciphering process has to be performed on the radio bearers selectively. For example, the BMC service includes Short Message Service—Cell Broadcast (SMS-CB), Short Message Service—Point to Point (SMS-PP), IP multicast service and so forth. SMS-CB service has the information for all user equipment in a cell, so there is no need to carry out the ciphering process.

By contrast, as far as the SMS-PP service is concerned, because one specific user equipment has a message only for another specific user equipment, the ciphering process is needed. Similarly, for IP multicast service, the information should be transferred to a user equipment in a particular group, so again the ciphering process needs to be done. However, according to the previous method for setting up the radio bearer, when the SMS-PP service or the IP multicast service are concerned, there were only two options for the equipments, that is, whether they are collectively enciphered or not. Therefore, discrimination of the ciphering service was impossible, and the SMS-CB service and the SMS-PP service could not be performed simultaneously no matter what.

Besides, if one provides a specific service, while ciphering the service at the same time, and then decides not to encipher the service at a certain point, the traditional method for setting up the radio bearer simply could not change the ciphering on that specific radio bearer, but instead all radio bearers had to be reset from the beginning. Furthermore, the information about every layer must be recollected to set up all of the radio bearers, and while doing so, a number of signaling overheads are caused. Even worse, a great amount of time is wasted in deciding whether or not to encipher the specific radio bearer.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is, therefore, an object of the present invention to provide a method for setting up a radio bearer, in a radio interface protocol, to carry out a ciphering process selectively on each radio bearer by deciding whether or not to carry out the ciphering process when setting up a radio bearer.

It is another object of the present invention to provide a method of changing ciphering performance information, in the course of providing a data service, using the setup radio bearers.

To achieve the above objects, there is provided a method for setting up a radio bearer in a radio interface protocol, which includes transferring the ciphering performance information from a designated layer to a radio resource control (RRC) layer; transferring the ciphering performance information from the RRC layer to a radio link control (RLC) layer; and enciphering data, at the RLC layer, in accordance with the ciphering performance information.

The designated layer includes a higher layer, a broadcast/multicast (BMC) layer, or/and a peer RRC layer.

The radio link control (RLC) layer is generated when a radio bearer is being set up.

The ciphering performance information can be changed in the middle of providing a data service, using a radio bearer that has been set up, and changing the cipher performance information is accomplished by changing a ciphering identifier that is transferred from the designated layer.

In another aspect of the present invention, there is provided a method for performing a ciphering process in a radio interface protocol, the method including transferring ciphering performance information and radio bearer setup information from a designated layer to a radio resource control (RRC) layer, upon receiving a radio bearer setup request; setting up, at the RRC layer, a radio bearer of a lower layer in accordance with the radio bearer setup information; generating a radio link control (RLC) layer in response to the request of the radio bearer setup; and enciphering data, at the RLC layer, in accordance with the ciphering performance information.

The ciphering process is performed by the RLC layer that is newly generated every time the request of the radio bearer setup is made.

In yet another aspect of the present invention, there is provided a method for changing a ciphering, including performing, at a radio link control (RLC) layer, a ciphering process on data in accordance with ciphering performance information that is transferred from a designated layer; updating the ciphering performance information in the designated layer; transferring the updated ciphering performance information to the RLC layer; and performing the ciphering process on the data in accordance with the updated ciphering performance information.

In a further aspect of the present invention, there is provided a method of ciphering data in a mobile telecommunication transceiver, including setting up, at a radio resource control (RRC) layer, a radio link control (RLC) layer and a radio bearer to meet a data service request; transferring ciphering performance information on the radio bearer from the RRC layer to the RLC layer; and ciphering data that is transmitted from the RLC layer through the radio bearer in accordance with the ciphering performance information.

Preferably, the radio bearer setup information is transferred from the designated layer to the RRC layer.

In a further aspect of the present invention, there is provided a method of setting up a radio bearer in a radio bearer protocol, including transferring ciphering performance information from a designated layer to a radio link control (RLC) layer, and ciphering information, communicated through the radio bearer, at the RLC layer in accordance with the ciphering performance information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
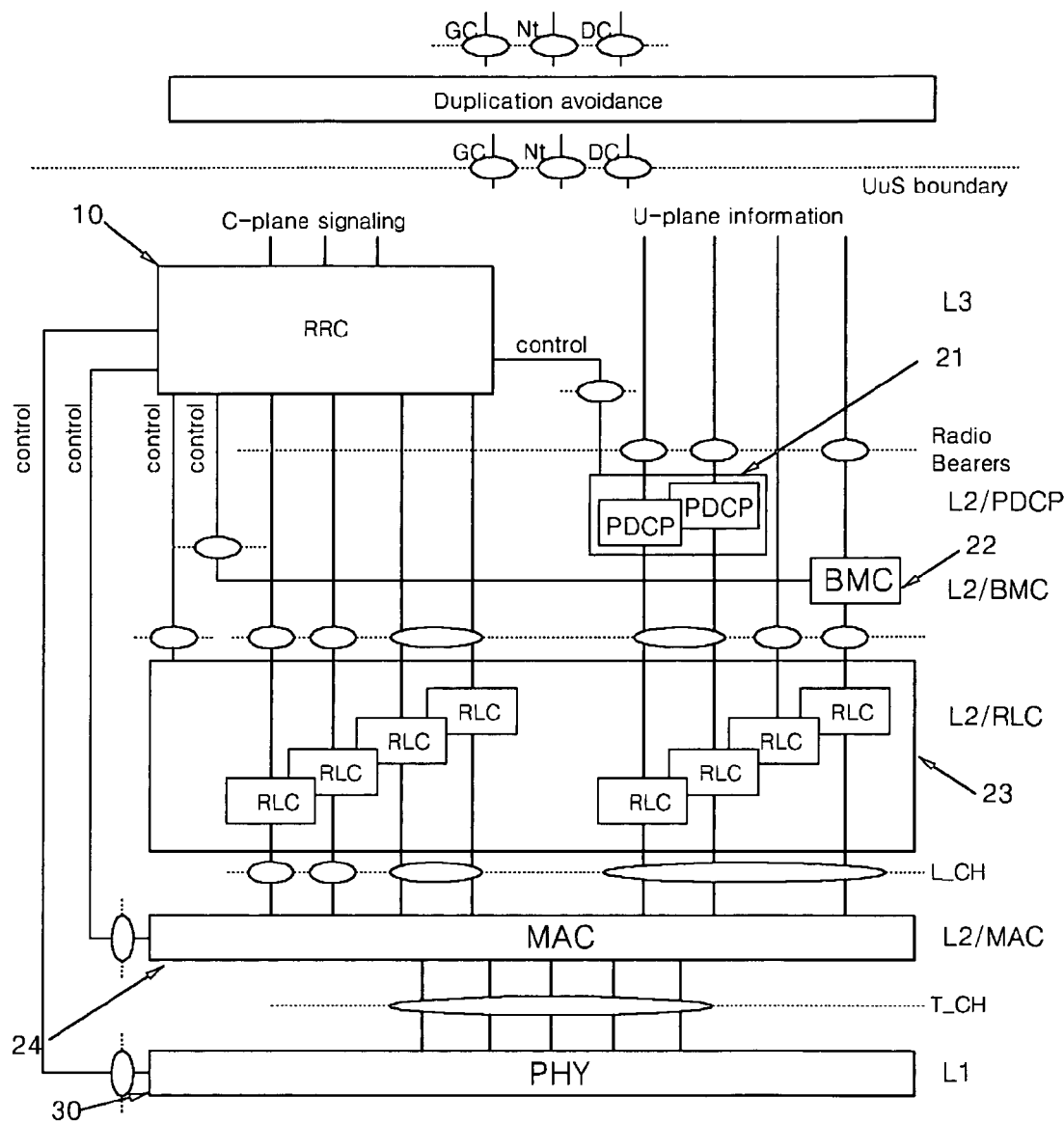
FIG. 1 illustrates a schematic diagram showing a related art configuration of a radio interface protocol in the $3^{rd}$ Generation Partnership Project (3GPP)
Figure 2:
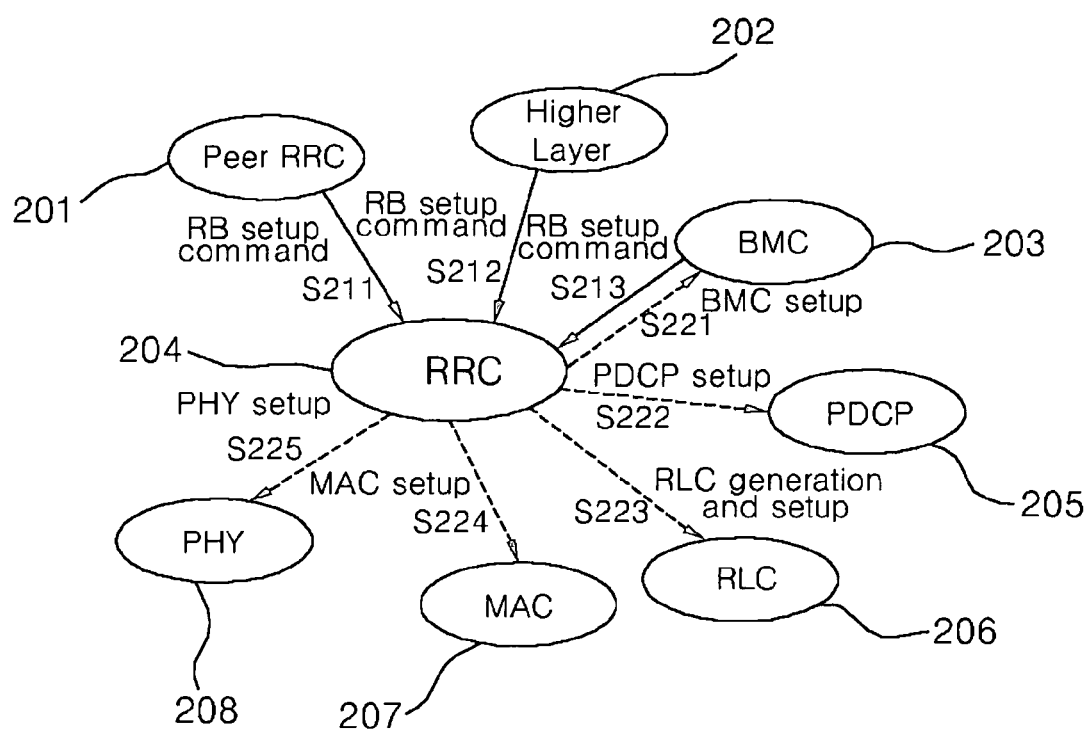
FIG. 2 illustrates a method for setting a radio bearer, in a radio interface protocol, according to the related art.
Figure 3:
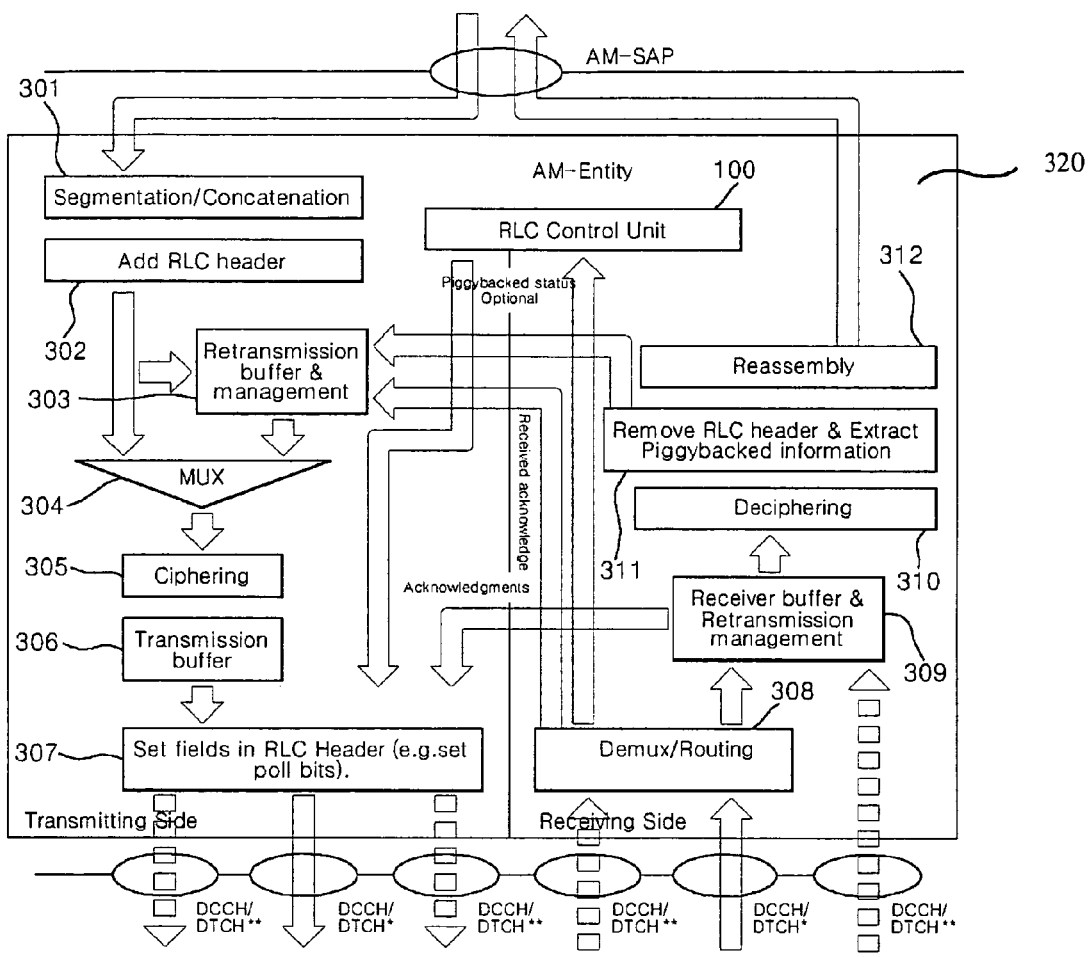
FIG. 3 illustrates a configuration of a radio link control acknowledge mode (RLC AM) entity.
Figure 4:
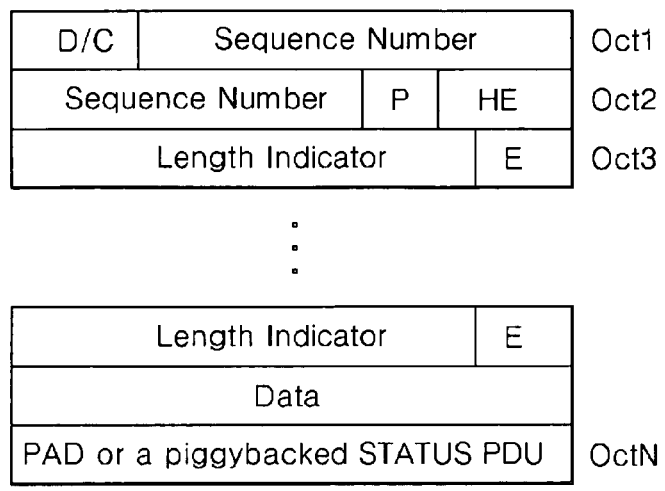
FIG. 4 illustrates a format configuration of the radio link control, AM data protocol data unit (RLC AMD PDU) used in FIG. 3.
Figure 5:
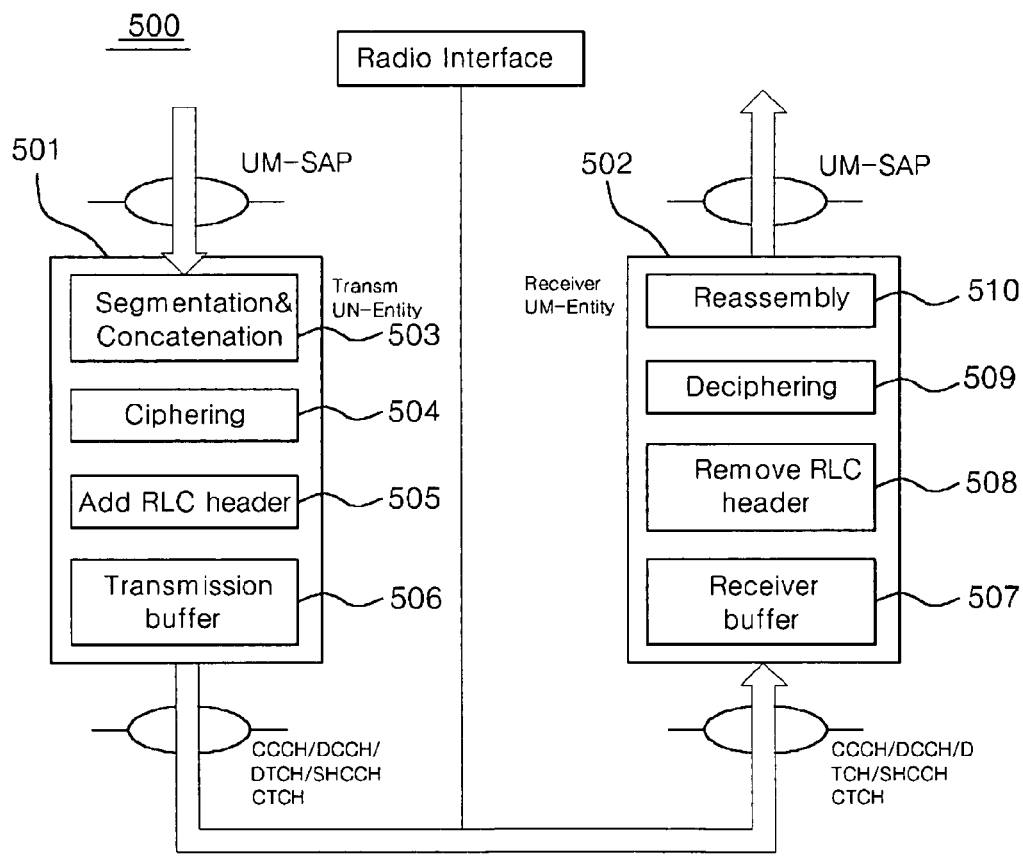
FIG. 5 illustrates a configuration of a radio link control unacknowledged mode (RLC UM) entity.
Figure 6:
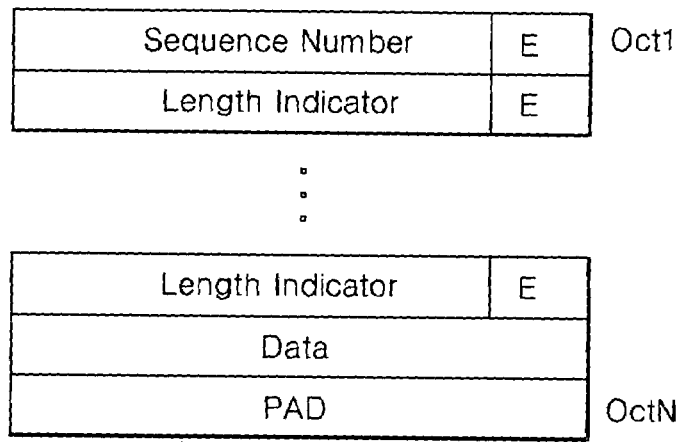
FIG. 6 illustrates a format configuration of the radio link control, UM data PDU (RLC UMD PDU) used in FIG. 5.
Figure 7:
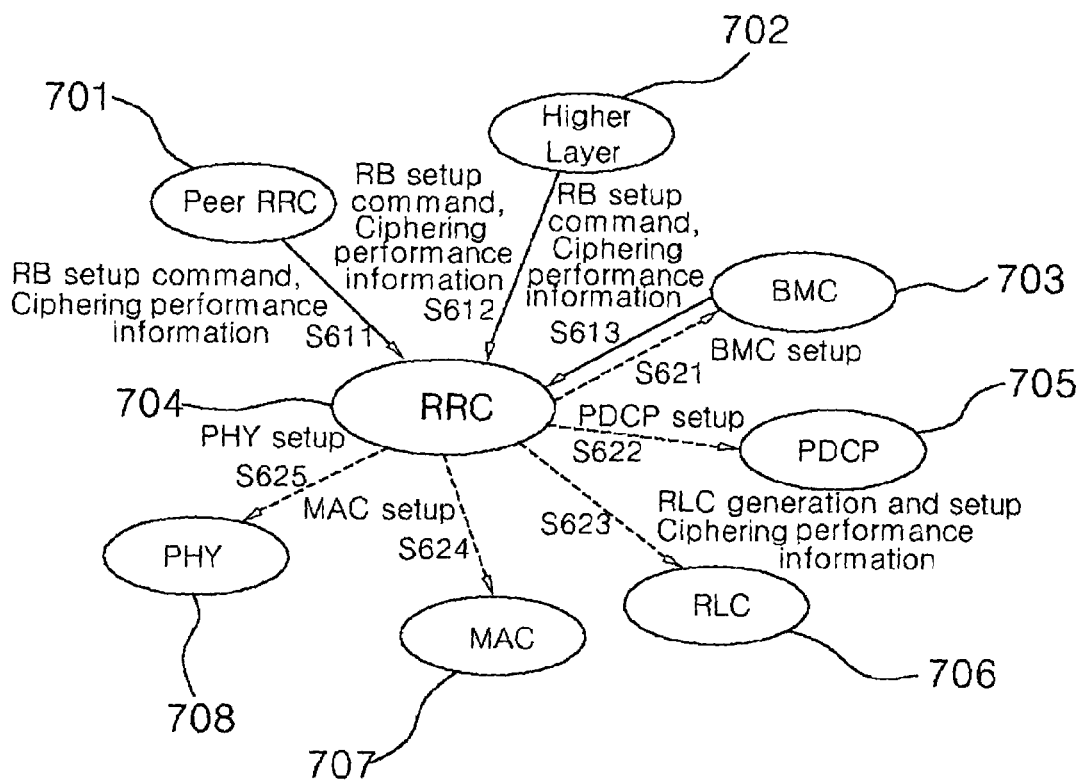
FIG. 7 illustrates a method for setting up a radio bearer in a radio interface protocol according to the present invention.

FIG. 7 illustrates a method for setting up a radio bearer in a radio interface protocol, in accordance with the present invention. The method for setting up a radio bearer of the present invention supports the transfer of information indicating whether or not to carry out a ciphering process. The method is particularly useful when at least one layer of a higher layer, a peer radio resource control (RRC) layer, or a broadcast/multicast control (BMC) layer requests the radio bearer setup of an RRC layer, in which the RRC layer sets up the radio bearer in a lower layer according to the request, and, at the same time, transfers the information about whether or not to carry out the ciphering process to a radio link control (RLC) layer that consequently determines the ciphering of data. It should be noted that the aforementioned RLC layer may be generated every time the radio bearer is set up.

Referring to FIG. 7, when a radio bearer setup command from peer RRC layer 701, higher layer 702, and BMC layer 703 is transferred to RRC layer 704, respectively, to provide different kinds of services to a specific user equipment (UE), the ciphering performance information is transferred as well (S611 through S613). The ciphering performance information indicates whether or not to carry out the ciphering process and, preferably, it is a ciphering indicator.

Figure 8:
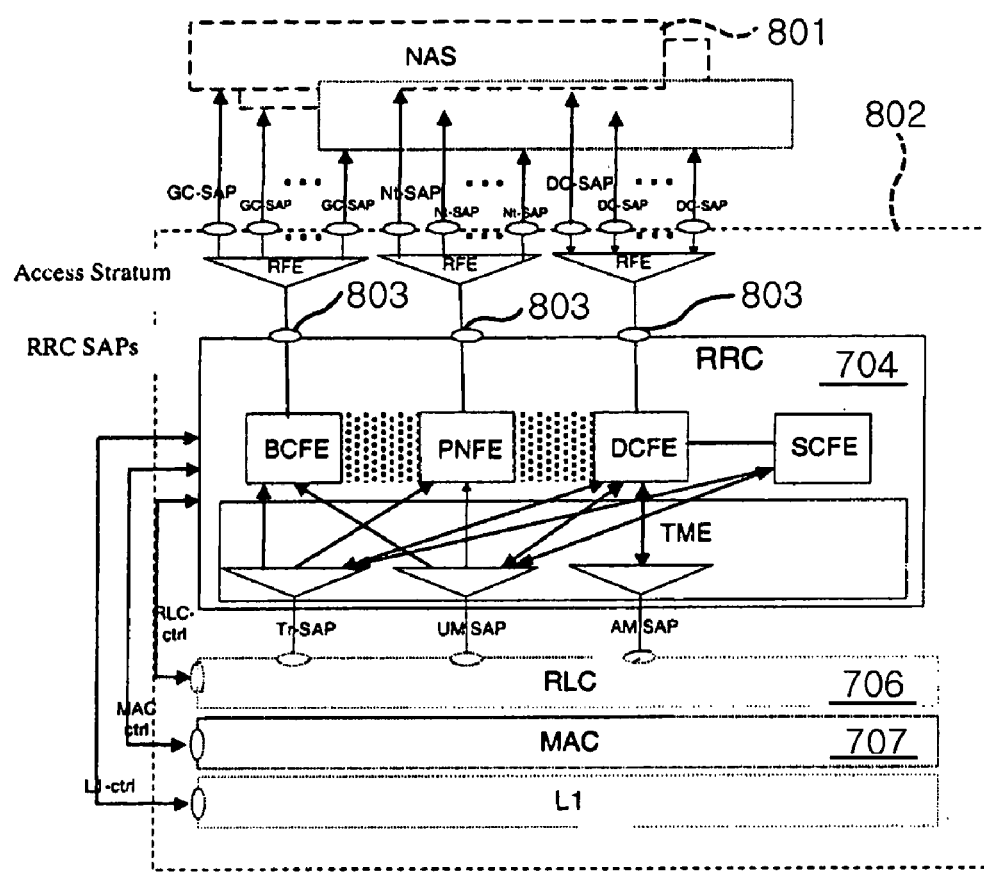
FIG. 8 illustrates a radio resource control, service access point (RRC SAP) according to the present invention.

FIG. 8 illustrates a radio resource control service access point (RRC SAP) according to the present invention.

The application of this procedure to different layers will now be described.

1) The radio bearer setup command and ciphering performance information are transferred from higher layer 702 to RRC layer 704 (S612).

When a certain service is provided from higher layer 702 to a lower layer, higher layer 702 first gives the radio bearer setup command to its lower layer, RRC layer 704, for setting up the radio bearer in the lower layer (S612). This is called a Non-Access Stratum, an upper group of an AS (NAS) message. The NAS message is located at a control plane, and it can be transferred from the NAS 801 to the Access Stratum 802 (i.e., a group including the RRC layer, BMC layer, PDCP layer, RLC layer, MAC layer, PHY layer and so on) through a Radio Resource Control Service Access Point (RRC SAP) 803. RRC SAP 803 includes three different kinds of service access points, such as, a General Control (GC) SAP, Notification (Nt) SAP, and Dedicated Control (DC) SAP. Therefore, when the radio bearer setup command is transferred to RRC layer 704 using the NAS message, the ciphering indicator can be included in the NAS message. The RRC layer 704 that received the NAS message sets up an appropriate radio bearer for the service to be provided to its lower layers, preferably, BMC layer 703, PDCP layer 705, RLC layer 706, MAC layer 707, and PHY layer 708 (S621 through S625). In addition, RRC layer 704 transfers the ciphering indicator to RLC layer 706. Then, RLC layer 706 performs the data ciphering according to the ciphering identifier. At this time, BMC layer 703 and PDCP layer 705 may or may not be used, depending on the kind of service.

2) The radio bearer setup command and ciphering performance information are transferred from peer RRC kayer 701 to RRC layer 704 (S611)

The radio bearer setup process of peer RRC layer 701 is part of the radio bearer setup procedure for higher layer 702. Therefore, if a certain service from higher layer 702 happens to be provided, higher layer 702 sets up its lower layer and, simultaneously, its own peer entity as well. In this manner, the data that needs to be transferred is sent out to peer RRC layer 701. To this end, RRC layer 704, having received a radio bearer setup command from higher layer 702, provides the radio bearer setup command to its peer RRC layer 701 through an information element. Peer RRC layer 701 also sets up its lower layer (S611). Data ciphering can be initiated within RIG layer 706 by inserting the ciphering indicator into the information element, to inform RLC layer 706 whether or not to perform the ciphering process. The reason why higher layer 702 and peer RRC layer 701 are distinguished from each other is because, from a viewpoint of one RRC layer 704, the radio bearer setup command can be transferred to NAS 801 or to the peer RRC layer 701.

3) The radio bearer setup command and ciphering performance information are transferred from BMC layer 703 to RRC layer 704 (S613)

The broadcast/multicast service function is performed in a Cell Broadcast Center (CBC), which is located in a Core Network (CN). When transferring some broadcast information, the CBC gives a radio bearer setup command to BMC layer 703, and BMC layer 703 transfers the radio bearer setup command to its RRC layer 704 through a primitive (5613). At this time, the ciphering indicator is inserted into the primitive for transference. The RRC layer 704 that receives the primitive sets up its lower layer and, at the same time, communicates this to the RRC layer of the other party, causing a lower layer of the other party to be set up as well. In addition, BMC layer 703 transfers the ciphering indicator to RLC layer 706, to encipher the data (S621 through S625).

Because the information that is transferred from higher layer 702, peer RRC layer 701, and BMC layer 703 is a signal message providing control information, rather than user data, it does not have a particular form like the PDU or SDU. Specifically speaking, the radio bearer setup command and the ciphering indicator are transferred through the NAS message when higher layer 702 sends the radio bearer setup command, the information element when peer RRC layer 701 sends the radio bearer setup command, and the primitive when BMC layer 703 sends the radio bearer setup command. When RRC layer 704 receives the request concerning the radio bearer setup command and whether or not to carry out the ciphering process, RRC layer 704 gives the command to its lower layer through the primitive.

Normally, the ciphering can be conducted in RLC layer 706 and MAC layer 707. Especially, since all radio bearers use MAC layer 707 in common, the ciphering process does not have to be done on each radio bearer. However, when RLC layer 706 is involved, the selective ciphering can be performed selectively because the layer is generated for each radio bearer, separately.

For example, in the case of RLC layer 706, the ciphering process for each radio bearer is performed in the AM and the UM only, not in the TM. This is so because the ciphering in the TM is performed in MAC layer 707, so a separate ciphering process for each radio bearer is not needed.

The RLC AM or UM receives the radio bearer setup command from RRC layer 704, sets up other parameters and, at the same time, decides whether or not to perform the ciphering process. If it is decided to perform the ciphering process, the RLC AM or UM enciphers the data and transfers the enciphered data to MAC layer 707. On the other hand, if the ciphering process has not been performed, the RLC AM or UM transfers the data directly to MAC layer 707 without performing the ciphering process.

Therefore, if RRC layer 704 sets up BMC layer 703, RRC layer 704 transfers CTCH environment (configuration) setup information to BMC layer 703 using CBMC-CONFIG-REG (S621).

In addition, if RRC layer 704 sets up PDCP layer 705, RRC layer 704 transfers header compression information, RLC-SAP information (i.e., which RLC should be used out of AM/UM/TM), and information about whether or not to conduct synchronization on the PDCP sequence number to PDCP layer 705 using CPDCP-CONFIG-REG (S622).

Furthermore, if RRC layer 704 sets up RLC layer 706, RRC layer 704, using CRLC-CONFIG-REG, gives RLC layer 706 the information including a necessary mode selection out of RLC AM, UM or TM; an RLC entity generation; a ciphering element (i.e., ciphering mode, ciphering key value and Hyper Frame Number (RLC HFN) value that are necessary for the ciphering, SN-AM and UM of the PDU to be enciphered); and other parameters necessary for each mode (S623). Preferably, in the case of the AM, the parameters include a PDU size, an in-sequence delivery indication, a timer value, a protocol parameter value, a polling trigger, a status trigger, an SDU discard mode, and so on. In the case of the UM, the parameter can be a timer value. In the case of the TM, the parameters can include a timer value and a segmentation indication.

RRC layer 704 can set up MAC layer 707 by transferring user equipment information (i.e., S-RNTI, C-RNTI, SRNC identity, activation time), RB information (i.e., transport channel identity, logical channel identity, MAC logical channel priority), transport channel information (i.e., transport format combination set), and a ciphering element (it is used only when the RLC is in the TM—ciphering mode, ciphering key value and the MAC HFN value), using CMAC-CONFIG-REQ (S624). RRC layer 704 also transfers CPHY-TrCH-CONFIG-REG or CPHY-RL-Setup-REG to PHY layer 708 (S625).

RRC layer 704 transfers the radio bearer setup command to each layer using the primitive and sets up the environment appropriate for the radio bearer.

The primitives can be reset at any time, in the middle of the radio bearer setup procedure. That is to say, if the user wishes to change a certain parameter, he or she can change the affected parameter only by sending a primitive including the parameter for change to RRC layer 704, again.

When selective ciphering is applied to each radio bearer, an additional parameter, called a 'ciphering identifier', is added to the CRLC-CONFIG-REG primitive sent from RRC layer 704 to RLC layer 706.

The decision on whether or not to perform the ciphering process can be adjusted in the RLC AM entity or UM entity. In other words, although the affected RLC entity is supposed to communicate whether or not to perform the ciphering process through the CRLC-CONFIG-REQ primitive, the decision can be changed through another CRLC-CONFIG-REQ primitive communication, especially when the user decides, in the middle of the ciphering process, not to encipher data.

Moreover, the radio bearer, even during its use, can experience the change in the ciphering performance information at any time, through the three signaling methods described above, and RRC layer 704 can encipher the data in RLC layer 706 according to the ciphering performance information. For instance, if the data is enciphered in accordance with the initial ciphering performance information, it is possible to discontinue enciphering the data by making a change in the ciphering performance information.

Since peer RRC layer 701, higher layer 702, and BMC layer 703 provide different services from one another, RRC layer 701 can receive the radio bearer setup command from at least one layer, among the layers including the peer RRC layer, the higher layer, and the BMC layer. Even in this case, the decision on whether or not to perform the ciphering process is eventually transferred to RRC layer 701, through the signaling described above. Then RRC layer 701 sets up its lower layer and gives the ciphering performance information to the lower layer.

In conclusion, the ciphering process can be carried out selectively for each radio bearer, which in turn enables the 3GPP to provide a variety of services at one time.

In addition, the method can change the ciphering performance information in the middle of providing data services, using the established radio bearer, thereby preventing time delay and providing the services more promptly.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting up a radio bearer in a radio interface protocol, comprising:
    transferring ciphering performance information of each radio bearer from a designated layer to a radio resource control (RLRC) layer, the ciphering performance information indicating whether data transmitted through each radio bearer should be enciphered or not;
    transferring the ciphering performance information of each radio bearer from the RRC layer to a radio link control (RLC) layer; and
    enciphering data of each radio bearer at the RLC layer in accordance with the ciphering performance information.

2. The method of claim 1, further comprising:
    transferring radio bearer setup information from the designated layer to the RRC layer; and
    setting up, at the RRC layer, a radio bearer of a lower layer in accordance with the radio bearer setup information.

3. The method of claim 1, wherein the designated layer is a higher layer, a broadcast/multicast (BMC) layer, or a peer RRC layer.

4. The method of claim 1, wherein the ciphering performance information is transferred to a higher layer using a non-access stratum (NAS) message.

5. The method of claim 1, wherein the RLC layer is generated when the radio bearer is set up.

6. The method of claim 1, wherein the ciphering performance information can be changed while providing a data service using a radio bearer that has been set up.

7. The method of claim 6, wherein changing the cipher performance information is accomplished by changing a ciphering identifier that is transferred from the designated layer.

8. A method for performing a ciphering process in a radio interface protocol, comprising:
    transferring ciphering performance information and radio bearer setup information of each radio bearer from a designated layer to a radio resource control (RRC) layer, upon receiving a radio bearer setup request, the ciphering performance information indicating whether data transmitted through each radio bearer should be enciphered or not;
    setting up, at the RRC layer, a radio bearer of a lower layer in accordance with the radio bearer setup information;
    generating a radio link control (RLC) layer in response to the radio bearer setup request; and enciphering data, at the RLC layer, in accordance with the ciphering performance information.

9. The method of claim 8, wherein the ciphering process is performed for every radio bearer setup request that is received.

10. The method of claim 8, wherein the designated layer is a higher layer, a broadcast/multicast (BMC) layer, or a peer RRC layer.

11. The method of claim 8, wherein the ciphering performance information is a ciphering identifier.

12. A method for changing a ciphering operation, comprising:
performing, at a radio link control (RLC) layer, a ciphering process on data in accordance with ciphering performance information of each radio bearer that is transferred from a designated layer, the ciphering performance information indicating whether the data should be enciphered or not for each radio bearer;
updating the ciphering performance information of each radio bearer in the designated layer;
transferring the updated ciphering performance information of each radio bearer to the RLC layer; and
performing the ciphering process on the data in accordance with the updated ciphering performance information.

13. The method of claim 12, wherein the designated layer is a higher layer, a broadcast/multicast (BMC) layer, or a peer RRC layer.

14. The method of claim 12, wherein the ciphering performance information indicates whether or not to perform the ciphering process.

15. The method of claim 12, wherein the ciphering performance information is a ciphering identifier.

16. A method of ciphering data in a mobile telecommunication transceiver, comprising:
setting up, at a radio resource control (RRC) layer, a radio link control (RLC) layer and a radio bearer;
transferring ciphering performance information of each radio bearer from the RRC to the RLC layer, the ciphering performance information indicating whether data transmitted through each radio bearer should be enciphered or not; and
ciphering data of each radio bearer at the RLC layer in accordance with the ciphering performance information.

17. The method of claim 16, further comprising transferring a data service request and related ciphering performance information from a designated layer to the RRC layer.

18. The method of claim 17, wherein radio bearer setup information is transferred from the designated layer to the RRC layer.

19. The method of claim 17, wherein the designated layer is a higher layer, a broadcast/multicast layer or a peer radio resource control layer.

20. The method of claim 16, wherein the ciphering performance information can be changed while providing the data service using the radio bearer that has been set up.

21. The method of claim 20, wherein changing the ciphering performance information is accomplished by changing a ciphering identifier that is transferred from a designated layer.

22. A mobile telecommunication transceiver capable of ciphering data, comprising:
means for setting up, at a radio resource control (RRC) layer, a radio link control (RLC) layer and a radio bearer;
means for transferring ciphering performance information of each radio bearer from the RRC to the RLC layer, the ciphering performance information indicating whether data transmitted through each radio bearer should be enciphered or not; and
means for ciphering data of each radio bearer at the RLC layer in accordance with the ciphering performance information.

23. The transceiver according to claim 22, further comprising means for transferring a data service request and related ciphering performance information from a designated layer to the RRC layer.

24. The transceiver according to claim 23, wherein radio bearer setup information is transferred from the designated layer to the RRC layer.

25. The transceiver according to claim 23, wherein the designated layer is a higher layer, a broadcast/multicast layer or a peer radio resource control layer.

26. The transceiver according to claim 22, wherein the ciphering performance information can be changed while providing the data service using the radio bearer that has been set up.

27. The transceiver according to claim 26, wherein changing the ciphering performance information is accomplished by changing a ciphering identifier that is transferred from a designated layer.

* * * * *